Jan. 1, 1952     F. R. VAN DER WOUDE     2,581,313
CONSTANT SPEED CLUTCH
Filed Nov. 12, 1948     2 SHEETS—SHEET 1
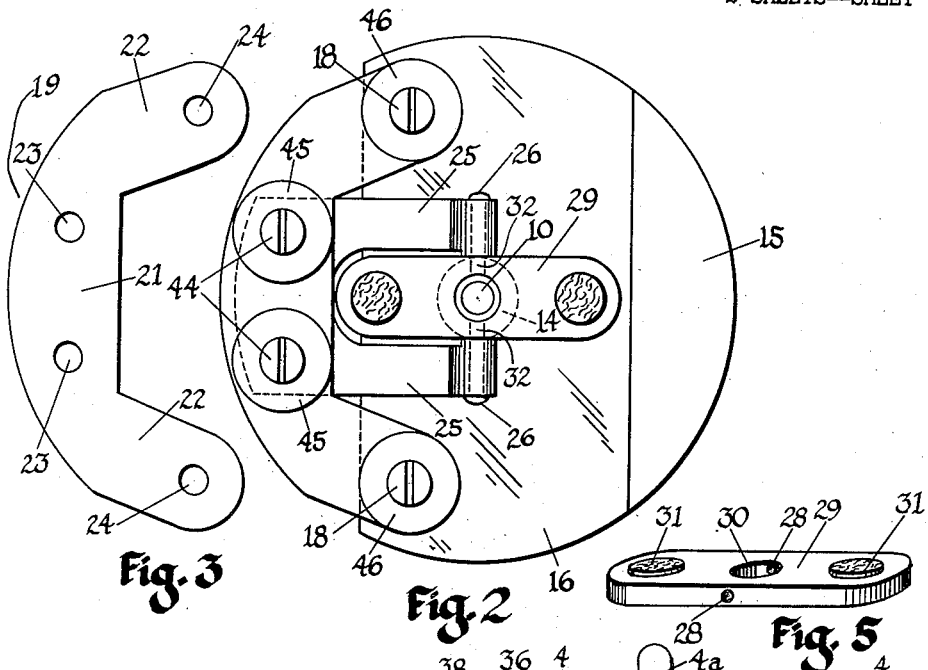
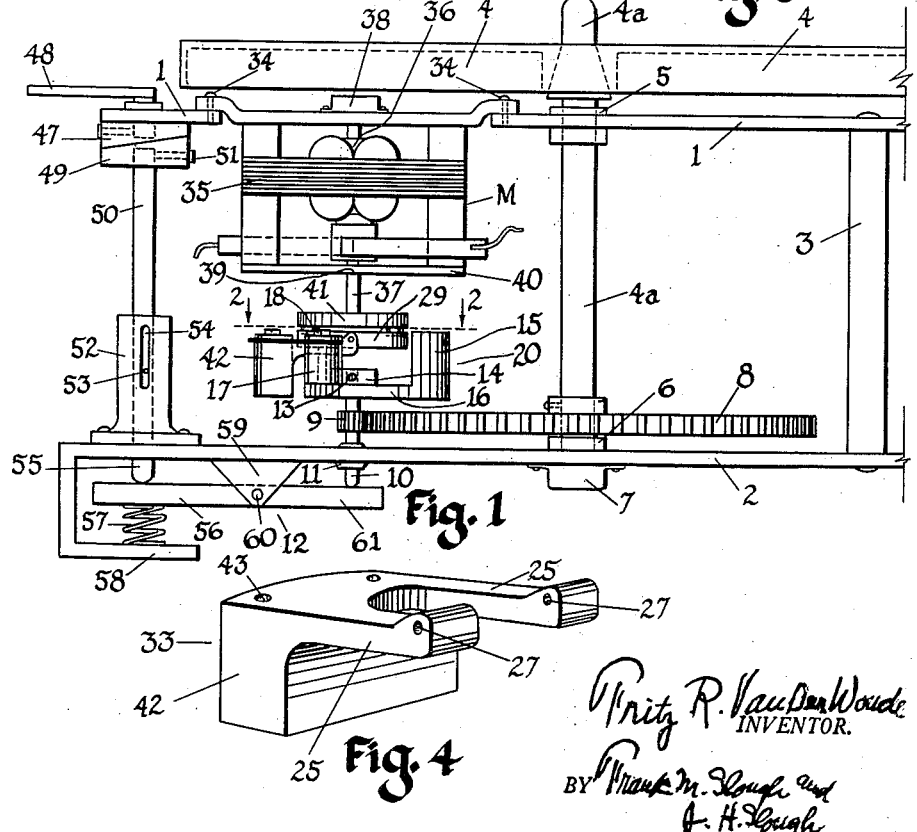

Jan. 1, 1952  F. R. VAN DER WOUDE  2,581,313
CONSTANT SPEED CLUTCH

Filed Nov. 12, 1948  2 SHEETS—SHEET 2

INVENTOR.
Fritz R. Van Der Woude
BY Frank M. Slough &
F. H. Slough.
Attorneys

Patented Jan. 1, 1952

2,581,313

UNITED STATES PATENT OFFICE 2,581,313

CONSTANT SPEED CLUTCH

Fritz R. van der Woude, Safford, Ariz., assignor to The General Industries Company, Elyria, Ohio, a corporation of Ohio Application November 12, 1948, Serial No. 59,566

1 Claim. (Cl. 192—104)

My invention relates to speed-governors, and though not limited thereto, relates to a type of speed-governor which is particularly adapted to govern the speed of rotation of a motor-driven rotatable element, such as a phonograph turntable.

Among the objects of my invention is to provide an improved speed-governor adapted to closely regulate the speed of a driven element, by intermittently varying and/or interrupting the driving force applied thereto.

Another object of my invention is to provide an improved governor mechanism which is adapted to confine variations of speed of the regulated part thereof within an extremely narrow range of speeds, without adding to the normal load imposed upon the driving motor.

Another object is to provide a very closely regulating governor mechanism, at low cost.

Another object of the invention, and the nature thereof, will be readily understood by reference to the accompanying description of a single embodiment thereof, wherein reference is made to the accompanying drawings of said embodiment, shown as applied to speed regulation of a phonograph turntable, and the said drawings comprising:

Figure 1 is a side elevational view of a typical direct-current motor disposed in driving relation to a phonograph turntable, with my improved speed-governing mechanism shown as serially disposed in the driving connections between said motor and said turntable.

Figure 2 is a plan view of a part of said mechanism the view being taken from the plane 2—2 of Fig. 1.

Fig. 3 is a plan view of a leaf spring support for portions of the said mechanism.

Fig. 4 is a perspective view of a centrifugally operable weight element, carried by the leaf spring of Fig. 3.

Fig. 5 is a perspective view of a friction plate, which is pivotally supported upon the weight element of Fig. 4.

Figure 6:
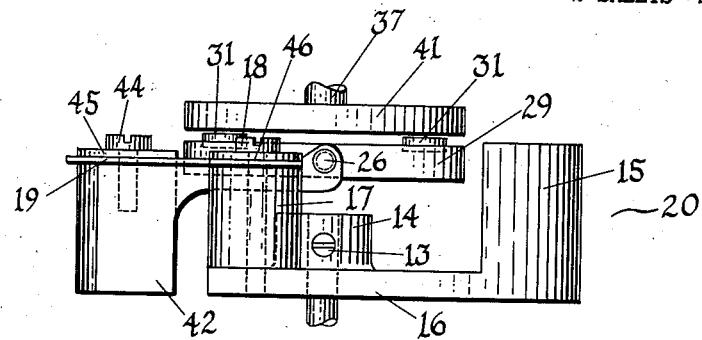
Fig. 6 is a side elevational view of a combined support and counter-weight element.

Referring now to the drawings in all of which like parts are designated by like reference characters, in the particular embodiment of my invention here shown, all of the parts are supported by a frame comprising an upper plate 1 and a lower plate 2 which are vertically interspaced and rigidly connected together as by a plurality of posts, only one of which, at 3, being shown.

The turntable 4, in any manner, is secured on the upper end of a vertical rotatable post 4a which, as shown, may be passed through bores of bearing elements 5 and 6, which are respectively secured within aligned apertures of the plates 1 and 2, the lower end of the post 4 being supported by bearing means of the thrust bearing element 7.

A large gear 8 is keyed onto the shaft 4, near the bearing element 6, said gear being meshed with a relatively small driving pinion 9 which is carried on a shaft 10, said pinion shaft having a lower end portion which passes through a vertical bearing guide element 11, with its lower end supported upon an adjustable lever 12.

Figure 7:
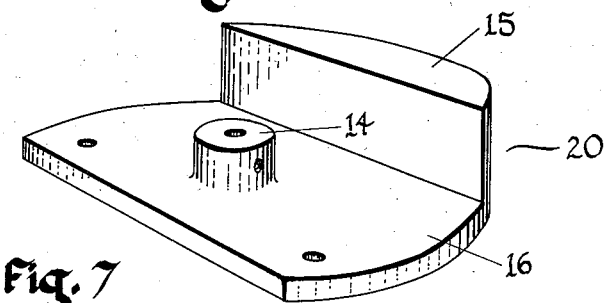
Fig. 7 is a perspective view of a counter-weight element which is supported on a shaft within a vertical bore of an upstanding boss.
Figure 8:
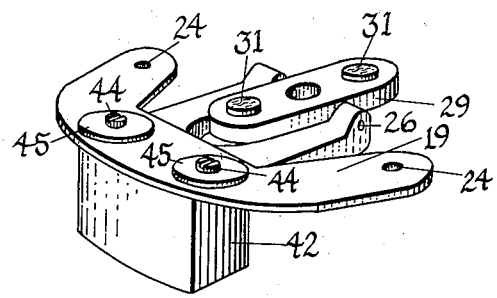
Fig. 8 is a perspective view of the assembled parts shown in Figs. 3, 4, and 5.
Figure 9:
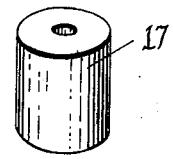
Fig. 9 is a perspective view of one board post.

The upper end of the shaft 10 is rigidly secured by a set screw 13 within a vertical bore of an upstanding boss 14 of the combined support and counter-weight element 20 of Figs. 6 and 7, the latter comprising, besides the upstanding counter-weight flange 15, a lowermost supporting base 16, the base having a pair of interspaced threaded apertures adapted to receive the lower ends of machine screws 18, Fig. 2.

The leaf spring 19 comprises a transverse yoke portion 21 and a pair of divergent arms 22, said yoke having a pair of perforations 23 and each said arm being perforated at 24.

A centrifugally operable governing weight element 33 is shown in Fig. 4, said weight element having a pair of arms 25, each arm being transversely bored near its free end, the bores 27 being relatively aligned, and each bore being adapted to receive a pivot pin 26.

A tiltable elongated friction plate 29 having a pair of friction pads 31 tightly secured thereto near its end portions, said pads projecting from its upper surface, is provided with a central vertical bore 30 and transverse bores 28 extending oppositely from its two side edges inwardly to communicate with the bore 30, said bores 28 being adapted to receive by a bearing fit the end portions 32 of the aforesaid pins 26. The tiltable plate 29 is assembled with the weight element 33 by successively projecting each pin through the relatively tight fitting bores 27 of the weight element arms 25, and then projecting their ends 32 by a bearing fit within the bores 28 of the plate 29. The friction plate element 29 is thus carried by the arms 25 of the element 33 and is freely tiltable between said arms 25, about the axes of the bores 26 and 28.

The weight element 33 comprises a pendant flange 42 at its end remote from the ends of the arms 25 and a pair of threaded recesses 43 project inwardly from a rearward portion of the upper surface of said weight element. The leaf spring 19, Fig. 3, is adapted to be secured to the upper rearward surface of the weight element of Fig. 5 by machine screws 44 first projected through washers 45, Fig. 2, and then through the apertures 23 of the yoke portion 21 of the spring member, the ends of said screws then being threaded into the apertures 43 of the weight element.

The entire assembly comprising the spring 19, the weight element 33 and the tiltable friction plate 29 are then together mounted onto the laterally extending horizontal base flange 16 which is formed integrally with the upstanding counter-weight flange 15 by projecting machine screws 18, Fig. 2, first through washers 46 then through the apertures 24 of the leaf spring 19 and then, each, through the board posts 17, upstanding pair of which being respectively placed over the aforesaid threaded apertures of the base flange 16 of the counterweight element 20, the machine screws passing through said washers, leaf spring, and board posts being then screw threaded into the said base flange apertures.

The motor M pendantly secured at 34 to the upper supporting plate 1 and having a suitable field structure 35 and rotor 36 is provided with a vertically extending rotor shaft 37, the upper end of which is secured within a bearing 38, which is of that type which permits free rotation of the shaft, but restrains the shaft from endwise movement. The lower end of the shaft is projected through an aperture at 39 of the motor and plate 40. A circular friction plate 41 is carried by the lower end of the shaft 37 which is secured to the central portion of the plate 41, and said friction plate therefore is rotatable with the shaft, said friction plate having a smooth polished lower end surface which is normally frictionally engaged with the upwardly presented pads 31 of the tiltable plate 29.

The apparatus shown at the left in Fig. 1 is provided for the purpose of providing means to manually vary the vertical adjustment of the tiltable plate 29, with respect to the rotatable disc 41, and comprises a rotatable cam 47 provided with a handle 48, said cam being journalled on the upper frame plate 1 and being in engagement with a cam follower 49 supported by a rod 50; the rod 50 is rigidly secured to said follower by a set screw 51, and is reciprocable in a bearing 52, a pin 53 being carried by said rod and laterally projecting therefrom through a slot 54 in the bearing. The lower end 55 of the rod rests upon the upper surface of a lever arm 56 being projected through an aperture in the plate 2, and said arm is biased upwardly by a compression spring 57 interposed between a lowermost arm 58 of the lower frame member 2. The adjustable lever 12 having the arm 56, is pivoted at 60 to a bracket 59 which is pendantly secured to the underside of the frame member 2 and the oppositely extending arm 61 affords a support, as previously stated, for the lower end of a pinion shaft 10 which carries the pinion 9.

The adjustment mechanism described is operable to raise and lower the pinion shaft 10 together with all portions of the assembly which comprises the counter-weight element 20 and the centrifugal weight 42 together with the friction plate 29.

The apparatus of my invention operates as follows: the electric motor M being energized by electric current supplied thereto in the usual manner; the rotor 36 with a shaft 37 and the disc 41 will be rotated at a speed which is designed to be slightly greater than that required to drive the turntable 4 at the desired rotational rate of said turntable, the driving being effected from the shaft 37 frictionally through the friction clutch comprising the disc 41 and plate 29, the pinion shaft 10 and pinion 9, the latter being in mesh with the large gear 8 secured near the lower end of the turntable shaft 4a.

When the motor approaches its normal speed and at the time that the turntable 4 is rotated "or slightly in excess of" at the desired rotational rate, the centrifugal weight 42 will tend to move radially outwardly, and since its upper end is secured to the yoke portion 21 of the leaf spring 19, the lower portion of the weight will move radially outward to a slight degree. This in turn will cause the arms 25 of the centrifugal weight element 33 to be lowered and since such downward movement of said arms lowers the friction plate 29, the driving connection between the motor and the turntable will be momentarily broken by withdrawal of the friction pads 31 from driving engagement with the lower surface of the disc 41. Thereupon since the governing movement of the weight 42 depends upon the speed at which the turntable 4 is driven by the pinion 9, and the driving connections being broken and rotational speed of the pinion 9 being reduced, the lower end of the weight 46 will be caused to move inwardly as a result of the retraction of the spring arms 22, thereby restoring the driving connection between the friction pads 31 and the disc 41. The same sequence of the action above described being continuously repeated, the desired net result is achieved that the turntable will be driven at a substantial uniform speed which is predetermined with precision by the vertical adjustment of the pinion shaft 10 as a result of swinging adjustable movement being given the cam handle 48.

Heretofore considerable difficulty has been experienced where a single friction pad has been used instead of the two relatively small pads 31 in governing mechanisms. It being substantially impractical to attempt making uniform pressure engagement of a plurality of such pads with a rotating element such as the disc 41, but of achieving this desirable result by placing these pads 31 in the plane of a diameter through the disc 41 and pivoting the plate 29 at its midportion so that neither pad can make any substantial amount of pressure engagement with the disc, without resultantly causing the other pad to effect equal pressure engagement at the opposite side of the axes of rotation of the disc.

In the mechanism above described, also, I provide an extremely efficient though simple friction clutch which is centrifugally operable, under control of the turntable speed, to vary the driving effect of the motor upon the turntable, in other words, the power is supplied to pulses, or increments from the turntable. The period of each increment being such a period as is required to bring the turntable up to a predetermined speed from a speed very slightly below the desired speed. It is clear that when the motor is first started, the clutch will be operable to transmit power for a much longer period than is the case with subsequent pulses when the turntable is rotated substantially at its desired normal speed.

Having thus described my invention, in a single embodiment, I am aware that numerous and extensive departures may be made from the embodiment herein illustrated and described, but without departing from the spirit of my invention and the scope of the appended claim.

I claim:

A clutch mechanism adapted to communicate rotary motion at a controlled speed from a first shaft to a second relatively co-axial and longitudinally displaced shaft of a power transmission means for driving a phonograph turntable, said mechanism comprising, in combination with said shafts, a rigid support secured to and rotatable with an end portion of said second shaft, a leaf spring of substantially U-form secured, by end portions of its legs which are relatively laterally interspaced, to corresponding interspaced points on said support which are relatively equidistant from the aligned axes of said shafts, and a U-shaped member secured by its yoke portion to the yoke portion of said spring and having a pair of arms which extend to opposite sides of the said shaft axes, a first clutch element secured to the lower end portion of the said first shaft and having a planular lower surface extending in a plane which is normal to the shaft axis, a second clutch element comprising a plate which is carried by, and pivotally secured by its middle portion to the extremities of the arms of said member and being tiltable about an axis extending transversely through said shaft axes, a pair of friction pads each secured at a respectively different or relatively opposite tilting end portions of the same face of said plate, and both correspondingly extending outwardly from said plate face and being presented in opposed relation to said planular lower surface of said first clutch element, a weight element joined at one end to the said yoke portions of said U-shaped member and of said U-shaped spring, said weight element having a free-end portion extending laterally of and in the general longitudinal direction of said second shaft, said pads being normally disposed in pressure-effected frictional engagement with said planular surface of said first clutch member, and said free-end portion of said weight element adapted, in response to rotational driving of said second clutch element by said first clutch element as a result of said frictional engagement of said pads with said planular surface of said first clutch element, to be variably centrifugally swung substantially radially outwardly from said shaft axes in opposition to the yieldable resilient restraint of said spring, and to thereby effect variable decreases of pressure exerted by said pads against said planular clutch surface, according to the prevailing rotative speed of said second clutch element.

FRITZ R. van der WOUDE.

REFERENCES CITED

The following references are of record in the file of this patent:

UNITED STATES PATENTS

| Number | Name | Date |
|---|---|---|
| 689,885 | Johnson | Dec. 31, 1901 |
| 755,852 | Dennison | Mar. 29, 1904 |
| 1,282,522 | Ayres | Oct. 22, 1918 |
| 1,651,800 | Bennett | Dec. 6, 1927 |
| 1,735,064 | Stehle | Nov. 12, 1929 |
| 1,823,555 | Naul | Sept. 15, 1931 |
| 1,983,250 | Tibbetts | Dec. 4, 1934 |
| 2,323,008 | Carrington | June 29, 1943 |

FOREIGN PATENTS

| Number | Country | Date |
|---|---|---|
| 268,379 | Great Britain | July 28, 1927 |